April 24, 1945. W. A. STURM 2,374,393
SCREW THREAD REPAIRING DEVICE
Filed June 2, 1944 2 Sheets-Sheet 1
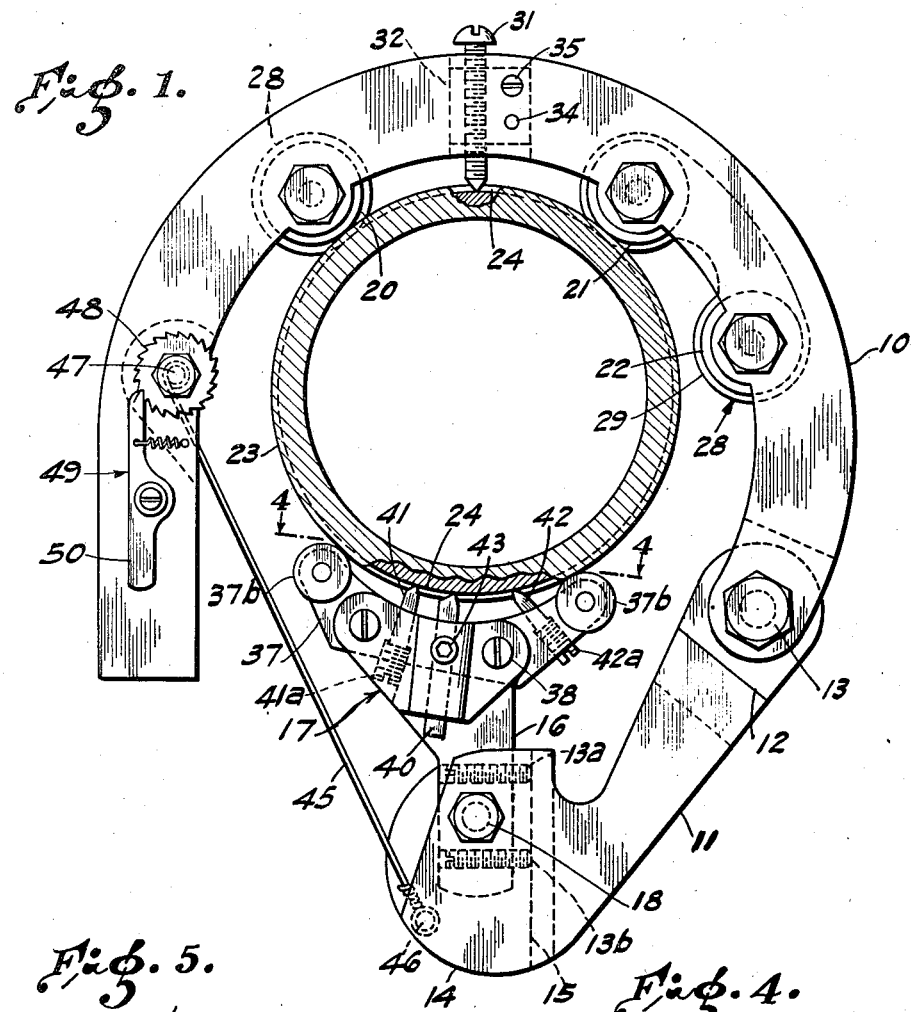
Fig. 1.
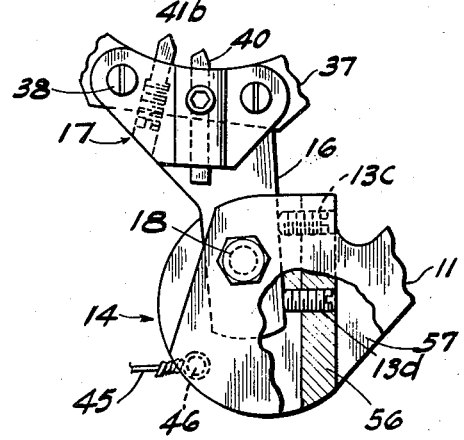
Fig. 5.
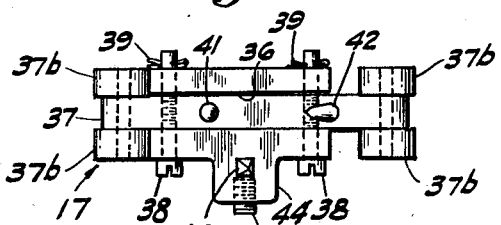
Fig. 4.
Walter A. Sturm,
INVENTOR.
Attorney.

April 24, 1945. W. A. STURM 2,374,393
SCREW THREAD REPAIRING DEVICE
Filed June 2, 1944 2 Sheets-Sheet 2
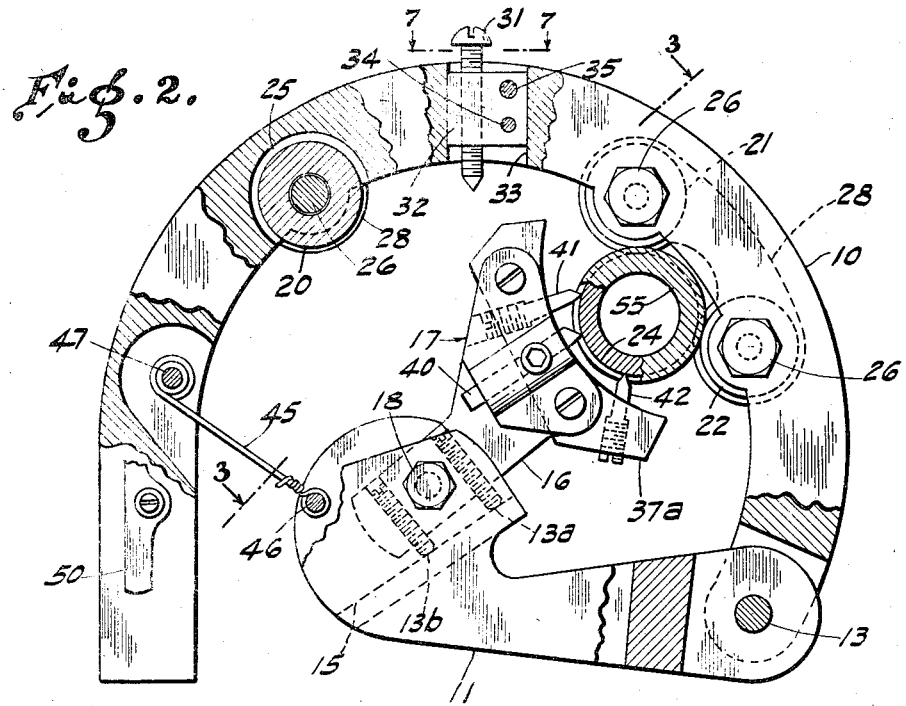
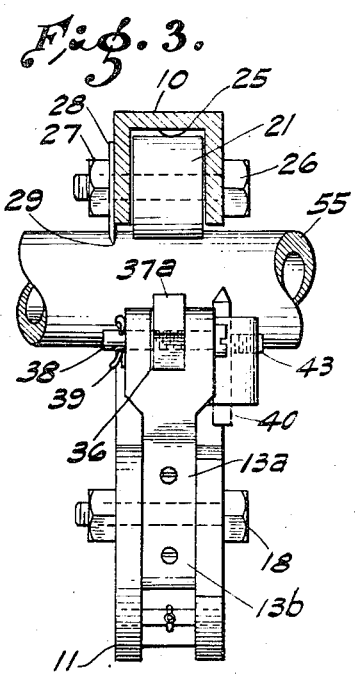
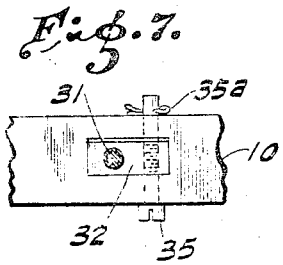
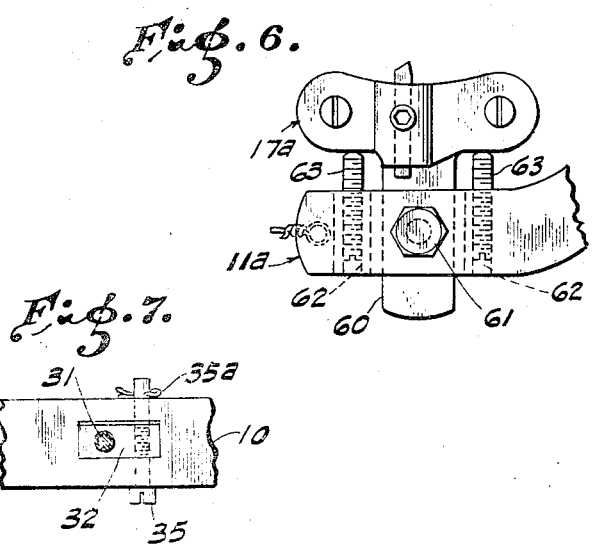
Walter A. Sturm,
INVENTOR.

Patented Apr. 24, 1945

2,374,393

UNITED STATES PATENT OFFICE 2,374,393

SCREW THREAD REPAIRING DEVICE

Walter A. Sturm, Los Angeles, Calif.

Application June 2, 1944, Serial No. 538,406

20 Claims. (Cl. 10—1)

This invention relates to a screw thread repairing device.

Numerous devices have been placed upon the market for operating dies and various tool elements for the purpose of repairing screw threads, or cutting them de novo upon pipes and other objects, but these appliances as a rule are not well adapted to be manually operated in a constricted space, as for example, in a ditch to operate upon a pipe which is buried under the soil except for a projecting end portion whereon it is desired to form new threads or repair old ones.

Among the objects of the invention are: to provide a device capable of a wider range of adjustment for use in repairing the screw threads of pipe and of other objects varying greatly in size; to provide a superior means for adjusting the thread cutters or chasers in a precise manner for operating upon different sizes of threads; and to provide a thread repairing device which may be satisfactorily operated by hand in constricted spaces, as for example, in a narrow trench where it is necessary to repair the threads of the projecting end of a pipe forming part of an underground conduit.

One of the objects of the invention is to provide a screw thread repairing device which is adapted for repairing all types of screw-threads, whether they be S. A. E., pipe threads or standard threads.

Other objects, advantages and features of invention will hereinafter appear.

Referring to the accompanying drawings, which illustrate what is at present deemed to be preferred embodiments of the invention, Fig. 1 is an end elevation of the device in its operative position in relation to a pipe, portions of the latter being broken away and sectioned at points where the threads thereof are being operated upon.

Fig. 2 is a view similar to Fig. 1 except that a much smaller pipe is shown being operated upon and more extensive portions of the structure are broken away in order to display underlying structures.

Fig. 3 is a section on line 3—3 of Fig. 2.

Fig. 4 is an elevation, the point or line of view being approximately indicated by the line 4—4 of Fig. 1.

Fig. 5 is a fragmentary view showing an alternative means for adjusting the die head or jaw.

Fig. 6 is a fragmentary elevation of another alternative means for adjusting the die head or jaw.

Fig. 7 is a fragmentary detail taken on line 7—7 of Fig. 2.

Referring in detail to the drawings, the device as shown, for example in Fig. 1, comprises an arcuate, rigid main member 10 having a shorter arm 11 fastened to one of its ends so as to swing in the same plane as that in which lies the arcuate outline of said member 10. The pivotal connection between said member 10 and said arm 11 is desirably made by means of bifurcating or slotting one end of said member, providing the attached end of the arm 11 with a thinned portion 12 which is loosely fitted into the slot thus formed and pivotally connecting the related parts to each other by means of a headed pin or bolt 13.

The swingable arm 11 carries a head 14 at its free end having in it a spacious slot 15 to receive adjustably the shank 16 of a cutter head 17, a pivot pin 18 extending across said slot to fasten said shank in place for swingable adjustment. The head 17 is maintained in its adjusted position by means of cooperating adjusting screws 13a and 13b disposed at opposite sides of the pivot 18 and operating in screw threaded bores provided for them through the shank 16. The inner ends of these screws abut against the bottom of the slot 15.

As well shown in Figs. 1 and 2 the arcuate main member 10 is shown furnished with three antifriction rollers 20, 21 and 22 suitably spaced apart therealong, in Fig. 1 the rollers 20 and 21 serving to sustain the weight of the device upon a large pipe 23 in position to repair its threads 24. As best shown in Fig. 3 there is provided for each of these rollers a recess 25 cut deeply into the inner side of the arcuate member 10 and each roller is attached by a pivot bolt 26. The aforesaid three rollers are desirably made of brass or of some other comparatively soft metal to minimize injury to the screw threads of the pipe 23. As shown in Fig. 3, each pivot bolt 26 has a nut 27 screwed onto it, this nut serving to clamp in place a thin plate or washer 28 at least one side of which is furnished with a sharp or attenuated edge 29 which, when the device is manually rocked as hereinafter described, tracks along the selected thread groove of the pipe and thereby aids in keeping the device in the proper operative position.

As an additional thread-tracking means a pointed screw 31 is screwed through and projects below a guide block 32 which is fitted adjustably within a wide slot 33 which extends radially and centrally through the midlength portion of the arcuate member 10. A fixed pin 34, which keeps the block in place and guides its adjustment, extends across said slot and is loosely related to said block. This block together with the thread-engaging screw 31 carried thereby, is adjustable transversely of the arcuate member 10 by means of an adjusting screw 35 which is in a screwthreaded relation to the block, and has a keeper 35a, as shown in detail in Fig. 7. This adjustment is made to accommodate variously spaced screw threads on pipes of different diameters, and to cooperate properly with the tools of the die head presently to be described.

Describing further the cutter head 17 shown in the lower portion of Fig. 1 and in Fig. 4, from end to end of this head, which is of an elongated form, extends along the top thereof a spacious groove 36 within which is mounted an adjustable jaw 37 or 37a (Fig. 2) which is somewhat narrower than the groove. A pair of threaded adjusting bolts 38 furnished with keepers 39 to pass through the head and jaw for use in laterally adjusting the jaw in the same manner as aforesaid screw 35. There is shown adjustably mounted upon the head 17 and its jaw a plurality of screwthread repairing and guide tools 40, 41 and 42. The repairing tool 40 is shown having a sixty degree pointed end which is preferably pyramidal, but is directed more to the right than toward the left as viewed in Fig. 1. This tool is shown (see Fig. 4) with a square shank having a working fit in a square hole through one side portion of the head 17 wherein it is held in adjusted position by a set screw 43, the tool carrying head desirably having a lateral projection 44 to afford more stock whereon to mount this tool.

The guiding tools 41 and 42 are carried by the adjustable jaw 37 or 37a, and are respectively furnished with screwthreaded shanks 41a and 42a. These tools are rotatable by means of a screw driver to extend or retract their point portions, as desired. Of the three last mentioned tools the repairing tool 40 is located nearest to the front side of the applied device, and the guiding tools 41 and 42, of which the latter is the smaller, are located farther back and substantially in circumferential alinement in relation to the pipe being repaired.

The jaw 37 of Figs. 1 and 4 differs from the jaw 37a of Fig. 2 in that the former jaw carries at each end a pair of rollers 37b which when the larger pipe is operated on, function similarly to rollers 22, already described.

Traction upon the swingable arm 11 to maintain the tool carrying head in an operative relation to the screw threads being repaired is effected by a connection 45 anchored at one end to a pin 46 carried by the arm enlargement of the head 14, and having its other end windable upon a turnable stub shaft 47 carried by that end portion of the arcuate member 10 which is opposite to the swingable arm 11. Said pin 47 has a polygonal head to receive a wrench and has fixed to it a ratchet wheel 48 with which cooperates a spring actuated pawl 49 having a tail piece 50 to enable the workman conveniently to release it from the ratchet wheel. By this arrangement the length of the straight run or operative portion of the connection 45 will be regulated to maintain the arm 11 in a more or less inswung relation to the arcuate main member 10.

In Fig. 2 the device is shown adjusted in an operative relation to a much smaller pipe 55, the thread repairing tools 40, 41 and 42 being shown held in engagement with said pipe by reason of the connection 45 having been wound up to a much greater extent. The side of the pipe opposite to said tools abuts against the already mentioned rollers 21 and 22.

It is to be understood that the pipes being operated on, whether large or small will in each case be supported in some stable manner, as for example, in a vise; or threads may be repaired upon a pipe mostly buried under the ground, provided an end portion of such pipe projects sufficiently to have the device applied thereto. Such projecting pipe end may be located within a narrow ditch without hampering a workman in repairing the threads thereof, because of the small amount of space required for efficient operation of the device in rocking it back and forth in repairing the threads.

Describing the alternative means shown in Fig. 5 for adjustably mounting the tool carrying head upon the swingable arm 11, the structure here shown is the same as that of Fig. 1 except that modified adjusting screws 13c and 13d are used, the inner ends of which abut against the right hand side of the shank 16. These screws operate in threaded bores through a wall 56 with which the head 14 is furnished, the head being additionally slotted or recessed at 57 to render the screw 13d accessible.

Describing the second alternative means shown in Fig. 6 for adjustably mounting the tool-carrying head upon the swingable arm 11a (11 in Fig. 1), in this view a modified T-shaped head 17a is furnished with a shank or stem 60 which is rockably fastened to said arm 11a by means of a pivot bolt 61. A screwthreaded bore 62 extends through this arm at each side of said pivot bolt and in each of these bores is a screwdriver operable threaded pin 63 having a projecting upper end engageable with the head 17a at one side of its pivot.

It will be observed that the tool-centering sockets or bores in the tool carrying jaw 37 in each instance are angularly related to each other so that they converge toward the work. This enables the workman, by adjusting the two tools at the ends of the series so that they project more or less so to position them that they operate properly upon the widely different sizes of pipe shown.

Owing to the fact that the points of the thread repairing tools accommodate themselves to all conventional V-shaped pipe threads, only one set of tools need be provided.

In operating the device, the pawl 49 is released from the ratchet wheel and the swingable arm 11 is then outswung sufficiently to admit within the device the end portion of a fixedly supported pipe the threads of which are to be repaired. Thereupon the main arcuate member 10 will be put in place upon the pipe with its thread-engaging tools in the positions of Fig. 1, if the larger size of pipe is to be operated on; or in the positions of Fig. 2 if the threads of the small pipe are to be repaired. Then the ratchet device will be operated to shorten the straight run of the connection 45 and render it sufficiently taut to maintain the various tools in proper contact with the work. Thereupon the workman will grasp opposite end portions of the main arcuate member in his hands and will rock it back and forth and by an additional rotary movement will from time to time advance the device to repair additional threaded portions of the pipe until all injured threads have been repaired.

The connection 45 is preferably made of piano wire or the like and possesses enough elasticity to permit the repairing tool 40 to ride over slight protuberances between threads until by repeatedly passing over them they are cut away to the level of the roots of the screw threads being repaired.

What is claimed is:

1. In a device of the kind described, an elongated main arcuate member, a plurality of anti friction rollers carried by said member and longitudinally spaced apart therealong, said rollers projecting internally from said arcuate member to engage one side portion of a screw threaded object being repaired by the device, an arm swingably pivoted to one end portion of said arcuate member, means for mounting tools upon said arm to repair screw threads, tools carried by said means, and adjustable traction means operatively connecting the free end portion of said swingable arm with that end portion of said arcuate member which is opposite to its pivoted connection with said swingable arm, said traction means being slightly elastic and serving to maintain said tools in an operative flexible relation to that side of the object being operated on which is opposite to the aforesaid rollers, said arcuate member being turnable in the direction of its length to cause said tools to perform their intended function.

2. In a device of the kind described, an elongated main arcuate member, an arm pivoted to one end portion of said member and swingable in the plane thereof toward and from its concave side, screw-repairing tools carried by said arm, and slightly elastic means to fasten said arm in a more or less inswung position to cause said tools to be brought into an operative relation to an object contained within the curvature of said arcuate member, said arcuate member being manually turnable back and forth in the direction of its length to operate said tools.

3. In a device of the kind described, an elongated main arcuate member, an arm pivoted to one end portion of said member and swingable in the plane thereof toward and from its concave side, screw-repairing tools carried by said arm, a flexible connection leading from said swingable arm to said arcuate member, and means to vary the operative length of said connection to fasten said arm in a more or less inswung position to cause said tools to be forced into a tight operative relation to an object contained within the curvature of said arcuate member, said arcuate member being manually turnable back and forth in the direction of its length to operate said tools.

4. In a device of the kind described, an elongated main arcuate member, an arm pivoted to one end portion of said member and swingable in the plane thereof toward and from its concave side, screw-repairing tools carried by said arm, a flexible connection leading from said swingable arm to said arcuate member, and pawl-and-ratchet controlled wind up means for said connection mounted upon said arcuate member to cause said tools to be brought into an operative relation to an object contained within the curvature of said arcuate member, said arcuate member being manually turnable back and forth in the direction of its length to operate said tools.

5. In a device of the kind described, an elongated main arcuate member, an arm pivoted to one end portion of said member and swingable in the plane thereof toward and from its concave side, screw-repairing tools carried by said arm, means to fasten said arm in a more or less inswung position to cause said tools to be brought into an operative relation to an object contained within the curvature of said arcuate member, said arcuate member being manually turnable back and forth in the direction of its length to operate said tools, and guides having attenuated portions projecting interiorly from said arcuate member and positioned to track between screw threads of an object being operated on by the device.

6. The subject matter of claim 5, and said guides consisting of washer like plates which are bolted to said arcuate member.

7. In a device of the kind described, an elongated head having a face portion to be directed toward and positioned adjacent to the work, said head having a longitudinal groove in said face portion, a tool carrying jaw of greater length and less width than said groove mounted therein and adjustable laterally in relation thereto, means carried by said head to adjust said jaw and maintain it in its adjusted position, and means for moving said head and tool carried thereby back and forth circumferentially in relation to a cylindrical object the threads of which are being repaired.

8. The subject matter of claim 7, and said jaw adjusting means comprising a turnable member extending across said groove and having a screw threaded relation to said jaw.

9. In a device of the kind described, a manually oscillatable arcuate member positionable after the manner of a saddle upon a cylindrical object having screw threads to be repaired, anti friction rollers carried by said member and projecting from the inner arc thereof to ride along the surface of the object having screw threads to be repaired, said rollers being in part contained in recesses in said member, pivot bolts carried by said member and extending through said recesses and rollers, and washer-like plates held in place by said bolts and positioned to track between screw threads of an object being operated on by the device, and screw-repairing tools operatively connected with said member and adjustable in relation thereto to and from a position for operating upon one side portion of the object being repaired while the opposite side portion thereof is engaged by said rollers.

10. In a device of the kind described, an elongated main arcuate member, an arm pivoted to one end portion of said member and swingable in the plane thereof toward and from its concave side, an elongated jaw carried by the free end portion of said arm and positionable in a circumferentially adjacent relation to a cylindrical externally screw-threaded object, a series of tools carried by said jaw and longitudinally spaced apart therealong, the end tools of said series having their work-engaging end portions directed toward each other, each end tool being adjustable to vary the extent it projects from said jaw and thereby position the series of tools for operating upon objects differing in diameter, and means to fasten said arm in a more or less inswung position to cause said tools to be brought into an operative relation to an object contained within the curvature of said arcuate member, said arcuate member being manually turnable back and forth in the direction of its length to operate said tools.

11. The subject matter of claim 10, and a roller mounted upon each end portion of said jaw to engage the periphery of the object being operated upon.

12. In a device of the kind described, an elongated main arcuate member, an arm pivoted to one end portion of said member and swingable in the plane thereof toward and from its concave side, screw repairing tools carried by said arm, and slightly elastic means to fasten said arm in a more or less inswung position to cause said tools to be brought into an operative relation to an object contained within the curvature of said arcuate member, said arcuate member being manually turnable back and forth in the direction of its length to operate said tools, the elasticity of said means lessening the resistance offered by protuberances over which said tools pass during the operation of the device.

13. The subject matter of claim 4 and, said arm carrying a head at its free end having in it a spacious slot, a cutter head having a shank adjustably mounted in said slot, and a pivot pin extending across said slot to fasten said shank in position for swingable adjustment, said screw-threading tools being mounted in said cutter head.

14. The subject matter of claim 4 and, said arm carrying a head at its free end having in it a spacious slot, a cutter head having a shank adjustably mounted in said slot, a pivot pin extending across said slot to fasten said shank in position for swingable adjustment, said screw-threading tools being mounted in said cutter head, and adjusting screws disposed at opposite sides of said pivot pin and operating in screw-threaded bores provided for them through said shank to maintain said cutter head in its adjusted position.

15. The subject matter of claim 4 and, said arm carrying a head at its free end having in it a spacious slot, a cutter head having a shank adjustably mounted in said slot, a pivot pin extending across said slot to fasten said shank in position for swingable adjustment, said screw-threading tools being mounted in said cutter head, and adjusting screws disposed at opposite sides of said pivot pin and operating in screw-threaded bores provided for them through said shank to maintain said cutter head in its adjusted position, the inner ends of said screws abutting against the bottom of said slot.

16. The subject matter of claim 5 and, a guide block fitted adjustably within a wide slot which extends radially and centrally through the mid-length portion of said arcuate member, and thread-tracking means comprising a pointed screw screwed through and projecting below said guide block.

17. The subject matter of claim 5 and, a guide block fitted adjustably within a wide slot which extends radially and centrally through the mid-length portion of said arcuate member, thread-tracking means comprising a pointed screw screwed through and projecting below said guide block, and a fixed pin in said arcuate member to keep said block in place and guide its adjustment, said pin extending across said slot and being loosely related to said block.

18. The subject matter of claim 5 and, a guide block fitted adjustably within a wide slot which extends radially and centrally through the mid-length portion of said arcuate member, thread-tracking means comprising a pointed screw screwed through and projecting below said guide block, a fixed pin in said arcuate member to keep said block in place and guide its adjustment, said pin extending across said slot and being loosely related to said block, and means to adjust said block and in turn the thread-engaging screw carried thereby transversely of said arcuate member.

19. The subject matter of claim 4 and, said arm carrying a head at its free end, a cutter head adjustably connected to said head, said cutter head being of an elongated form and having a face portion directed toward and positioned adjacent to the work, said cutter head having a longitudinal groove in said face portion, an adjustable jaw somewhat narrower than said groove mounted in said groove, and a pair of threaded bolts extending laterally through said cutter head and jaw to adjust said jaw laterally in relation to said cutter head, some of said screw-threading tools being mounted in said jaw.

20. The subject matter of claim 4 and, said arm carrying a head at its free end, a cutter head adjustably connected to said head, said cutter head being of an elongated form and having a face portion directed toward and positioned adjacent to the work, said cutter head having a longitudinal groove in said face portion, an adjustable jaw somewhat narrower than said groove mounted in said groove, a pair of threaded adjusting bolts extending laterally through said cutter head and jaw to adjust said jaw laterally in relation to said cutter head, some of said screw-threading tools being mounted in said jaw, and a pair of rollers carried at each end of said jaw to engage the periphery of the threaded object being operated upon.

WALTER A. STURM.